United States Patent
Berndt (10) Patent No.: US 9,719,382 B2
(45) Date of Patent: Aug. 1, 2017

(54) VARIABLE CAMSHAFT PHASER WITH CONE CLUTCHES

(71) Applicant: Schaeffler Technologies AG & Co. KG, Herzogenaurach (DE)

(72) Inventor: Eric Berndt, Whitefish Bay, WI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 76 days.

(21) Appl. No.: 14/942,549

(22) Filed: Nov. 16, 2015

(65) Prior Publication Data

US 2017/0138229 A1    May 18, 2017

(51) Int. Cl.
| | |
|---|---|
| *F01L 1/34* | (2006.01) |
| *F01L 1/46* | (2006.01) |
| *F01L 1/344* | (2006.01) |
| *F16D 13/24* | (2006.01) |
| *F16D 41/08* | (2006.01) |
| *F16D 125/64* | (2012.01) |

(52) U.S. Cl.
CPC .............. *F01L 1/46* (2013.01); *F01L 1/344* (2013.01); *F16D 13/24* (2013.01); *F16D 41/08* (2013.01); *F16D 2125/64* (2013.01)

(58) Field of Classification Search
CPC .. F01L 1/46; F01L 1/344; F16D 13/24; F16D 41/08; F16D 2125/64

USPC ...................................................... 123/90.17
See application file for complete search history.

(56) References Cited

U.S. PATENT DOCUMENTS

| | | | |
|---|---|---|---|
| 5,870,983 A * | 2/1999 | Sato | ............... F01L 1/34406 123/90.17 |
| 7,669,566 B2 | 3/2010 | Methley | |
| 2011/0162605 A1 | 7/2011 | Wigsten | |

* cited by examiner

*Primary Examiner* — Zelalem Eshete (57) ABSTRACT

A camshaft phaser, including: a housing; and a phase adjustment assembly including: first and second frusto-conical shaped surfaces arranged to non-rotatably connect to a camshaft, a first one-way clutch including a third frusto-conical shaped surface; a second one-way clutch including a fourth frusto-conical shaped surface; and a displacement assembly including: a first resilient element arranged to, for an advance mode, displace the first surface in a first axial direction to non-rotatably connect the first and third surfaces and enable the second surface to rotate with respect to the housing in a first circumferential direction; and a second resilient element arranged to, for a retard mode, displace the second surface in a second axial direction to non-rotatably connect the second and fourth surfaces and enable the first surface to rotate with respect to the housing in a second circumferential direction, opposite the first circumferential direction.

20 Claims, 6 Drawing Sheets

VARIABLE CAMSHAFT PHASER WITH CONE CLUTCHES

TECHNICAL FIELD

The present disclosure relates to a variable camshaft phaser with cone and one-way clutches. In particular, the cone clutches, with axially displaceable frusto-conical surfaces, are used to advance and retard the phase of the rotor with respect to the stator.

BACKGROUND

It is known to use fluid pressure in chambers created by respective portions of a stator and a rotor for a camshaft phaser to maintain and shift a rotational position of the rotor with respect to the stator. This known technique involves complicated hydraulic systems and controls. Typically, smaller engines do not have a sufficient hydraulic oil supply to properly implement hydraulic camshaft phasing. Typically, it is difficult to obtain the advantages of cam phasing without the need for hydraulic oil supply in smaller engines.

SUMMARY

According to aspects illustrated herein, there is provided a camshaft phaser, including:
a housing arranged to receive torque from an engine; and a phase adjustment assembly including: first and second frusto-conical shaped surfaces tapering radially outward in first and second opposite axial directions, respectively and, arranged to non-rotatably connect to a camshaft, a first one-way clutch including a first outer race non-rotatably connected to the housing and a first inner race including a third frusto-conical shaped surface; a second one-way clutch including a second outer race non-rotatably connected to the housing and a second inner race including a fourth frusto-conical shaped surface; and a displacement assembly including: a first resilient element arranged to, for an advance mode, displace the first frusto-conical shaped surface in the first axial direction so that the first frusto-conical shaped surface non-rotatably connects to the third frusto-conical shaped surface and the second frusto-conical shaped surface is rotatable with respect to the housing in a first circumferential direction; and a second resilient element arranged to, for a retard mode, displace the second frusto-conical shaped surface in the second axial direction so that the second frusto-conical shaped surface non-rotatably connects to the fourth frusto-conical shaped surface and the first frusto-conical shaped surface is rotatable with respect to the housing in a second circumferential direction, opposite the first circumferential direction.

According to aspects illustrated herein, there is provided a camshaft phaser, including: a housing arranged to receive torque from an engine; and a phase adjustment assembly including a first one-way clutch with a first frusto-conical shaped surface, a second one-way clutch with a second frusto-conical shaped surface, a cone-clutch component arranged to non-rotatable connect to the camshaft and, including third and fourth frusto-conical shaped surfaces and a displacement assembly including: a first resilient element arranged to, for an advance mode, displace the first frusto-conical shaped surface in the first axial direction so that the first frusto-conical shaped surface non-rotatably connects to the third frusto-conical shaped surface and the second frusto-conical shaped surface is rotatable with respect to the housing in a first circumferential direction; and a second resilient element arranged to, for a retard mode, displace the second frusto-conical shaped surface in the second axial direction so that the second frusto-conical shaped surface non-rotatably connects to the fourth frusto-conical shaped surface and the first frusto-conical shaped surface is rotatable with respect to the housing in a second circumferential direction, opposite the first circumferential direction.

According to aspects illustrated herein, there is provided a method of phasing a camshaft including: receiving, using a housing for a camshaft phaser, torque from an engine; for an advance mode displacing, in a first axial direction and using a first resilient element, a first frusto-conical shaped surface for the camshaft phaser, the first frusto-conical shaped surface non-rotatably connected to the camshaft and, non-rotatably connecting the first frusto-conical shaped surface to a second frusto-conical shaped surface included in an inner race for a first one-way clutch included in the camshaft phaser and non-rotatably connected to a housing for the camshaft phaser; and for a retard mode displacing, in a second axial direction opposite the first axial direction and using a second resilient element, a third frusto-conical shaped surface for the camshaft phaser, the third frusto-conical shaped surface non-rotatably connected to the camshaft and, non-rotatably connecting the third frusto-conical shaped surface to a fourth frusto-conical shaped surface included in an inner race for a second one-way clutch included in the camshaft phaser and non-rotatably connected to the housing included in an inner race for the second one-way clutch.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
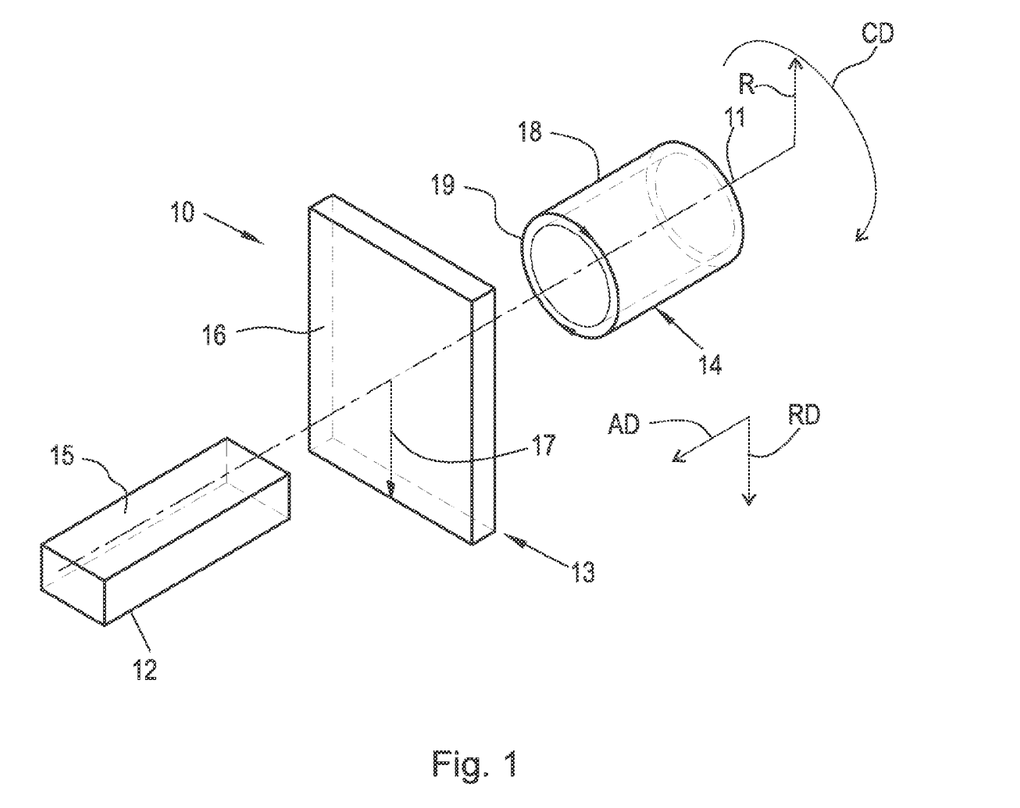
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
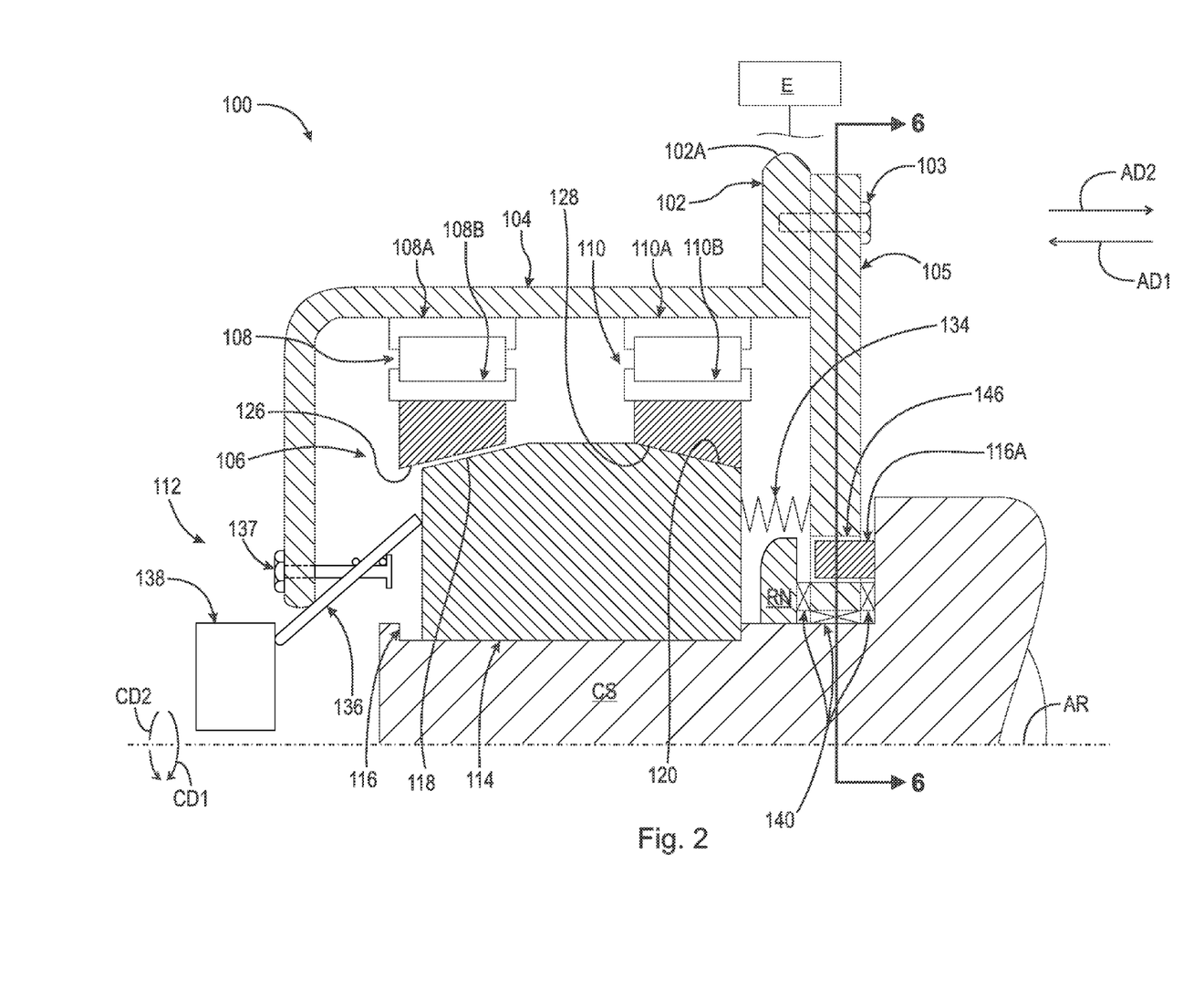
FIG. 2 is a cross-sectional view of a first example embodiment of a camshaft phaser with cone clutches in an advance mode.

FIG. 2 is a cross-sectional view of a first example embodiment of camshaft phaser 100 with cone clutches in an advance mode.

Figure 3:
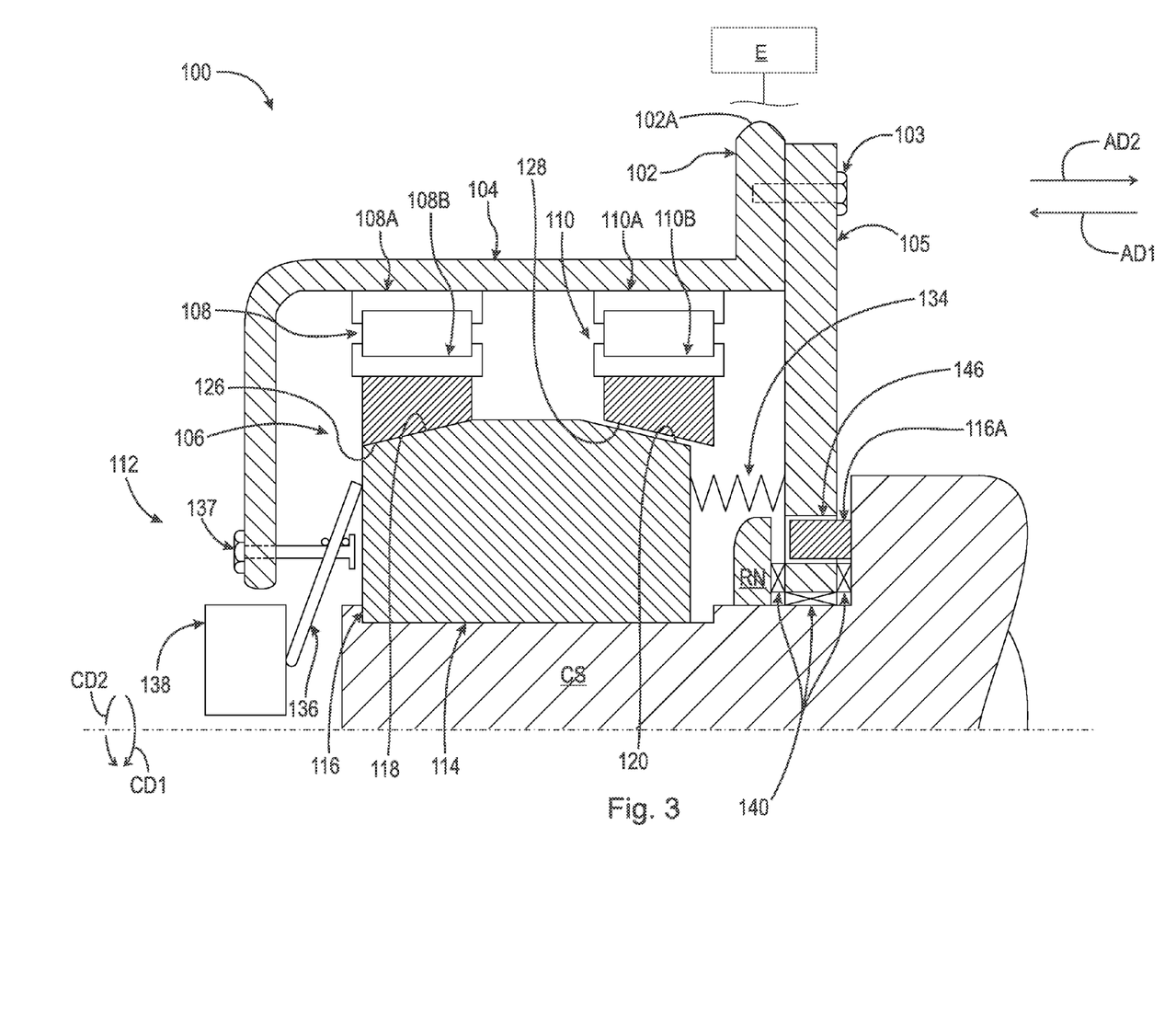
FIG. 3 is a cross-sectional view of the camshaft phaser shown in FIG. 2 in an retard mode.

FIG. 3 is a cross-sectional view of camshaft phaser 100 shown in FIG. 2 in a retard mode. Camshaft phaser 100 includes housing 104, back plate 105, phase adjustment assembly 106, one-way clutch 108, one-way clutch 110, and displacement assembly 112. Housing 104 is arranged to receive torque from engine E. In an example embodiment, phaser 100 includes gear 102, non-rotatably connected to housing 104 and arranged to receive the torque from engine E via sprocket 102A. In an example embodiment, gear 102 and housing 104 are integrally formed. The discussion that follows assumes phaser 100 includes gear 102 and that gear 102 rotates in circumferential direction CD1. However, it should be understood that the configuration of phaser 100 shown in the Figures can be modified to operate with gear 102 rotating in circumferential direction CD2, opposite direction CD1. Phase adjustment assembly 106 includes cone-clutch component 114 which is arranged to non-rotatably connect to camshaft CS via spline connection 116. Spline connection 116 enables cone-clutch element 114 to move axially on camshaft CS while maintaining a non-rotatable connection with camshaft CS. By "non-rotatably connected" elements, we mean that: the elements are connected so that whenever one of the elements rotates, all the elements rotates; and relative rotation between the elements is not possible. Radial and/or axial movement of non-rotatably connected elements with respect to each other is possible, but not required.

Component 114 includes frusto-conical shaped surfaces 118 and 120. By frusto-conical, we mean having the shape of a frustum of a cone. By frustrum we mean the part of a conical shape left after cutting off a top portion of the shape with a plane parallel to the base of the shape. In the example of FIGS. 2 and 3, surfaces 118 and 120 taper radially inward on cone-clutch component 114 in opposite axial directions AD1 and AD2, respectively. Advance one-way clutch 108 includes outer race 108A non-rotatably connected to housing 104 and inner race 108B including frusto-conical shaped surface 126. Retard one-way clutch 110 includes outer race 110A non-rotatably connected to housing 102 and inner race 110B including frusto-conical shaped surface 128. Frusto-conical shaped surface 126 tapers radially inward in axial direction AD1 and frusto-conical shaped surface 128 tapers radially inward in axial direction AD2. In an example embodiment, one-way clutches 108 and 110 are axially fixed with respect to housing 102.

In an example embodiment, displacement assembly 112 includes resilient element 134 and actuator 138, for example, linear actuator 138. Element 134 urges component 114 in axial direction AD1 and actuator 138 is axially movable in axial directions AD1 and AD2. Linear actuator 138 engages and pivots resilient element 136 on pin 137 via snap rings on pin 137. When linear actuator 138 moves in axial direction AD1, resilient element 136 is pivoted so that cone-clutch component 114 is displaced by element 136 in axial direction AD2, against resilient element 134. When linear actuator 138 moves in axial direction AD2, resilient element 136 is pivoted so that resilient element 134 displaces cone-clutch component 114 in axial direction AD1. Resilient element 134 can be any resilient element known in the art, including but not limited to, a coil spring or diaphragm spring. Resilient element 136 can be any resilient element know in the art, including but not limited to, a diaphragm or wave spring.

For the advance mode for camshaft phaser 100 (further described below), linear actuator 138 and element 136 are arranged to displace cone-clutch component 114 in axial direction AD2 so that frusto-conical shaped surface 120 non-rotatably connects to frusto-conical shaped surface 128. Frusto-conical shaped surface 118 is free of connection to clutch 108.

For the advance mode, the non-rotatable connection of frusto-conical shaped surfaces 120 and 128 is arranged to block rotation of frusto-conical shaped surface 120 of cone-clutch component 114 (and camshaft CS), with respect to housing 102, in circumferential direction CD2, while enabling rotation of component 114 (and camshaft CS), with respect to housing 102, in circumferential direction CD1. That is, one-way clutch 110 is rotatable only in direction CD1.

For the retard mode for camshaft phaser 100 (further described below), linear actuator 138 is arranged to displace in direction AD2 so that element 134 displaces cone-clutch component 114 in axial direction AD1. Frusto-conical shaped surface 118 non-rotatably connects to frusto-conical shaped surface 126. Frusto-conical shaped surface 120 is free of connection to clutch 110.

For the retard mode, the non-rotatable connection of frusto-conical shaped surfaces 118 and 126 is arranged to block rotation of frusto-conical shaped surface 118 (and camshaft CS), with respect to housing 102, in circumferential direction CD1, while enabling rotation of component 114 (and camshaft CS), with respect to housing 102, in circumferential direction CD2. That is, one-way clutch 108 is rotatable only in direction CD2.

In an example embodiment, camshaft phaser 100 includes radial and thrust bearings 140 positioned between back plate 105 and camshaft CS and held in place by retaining nut RN. Back plate 105 is secured to housing 102 by any means known in the art, for example bolts 103.

Figure 4:
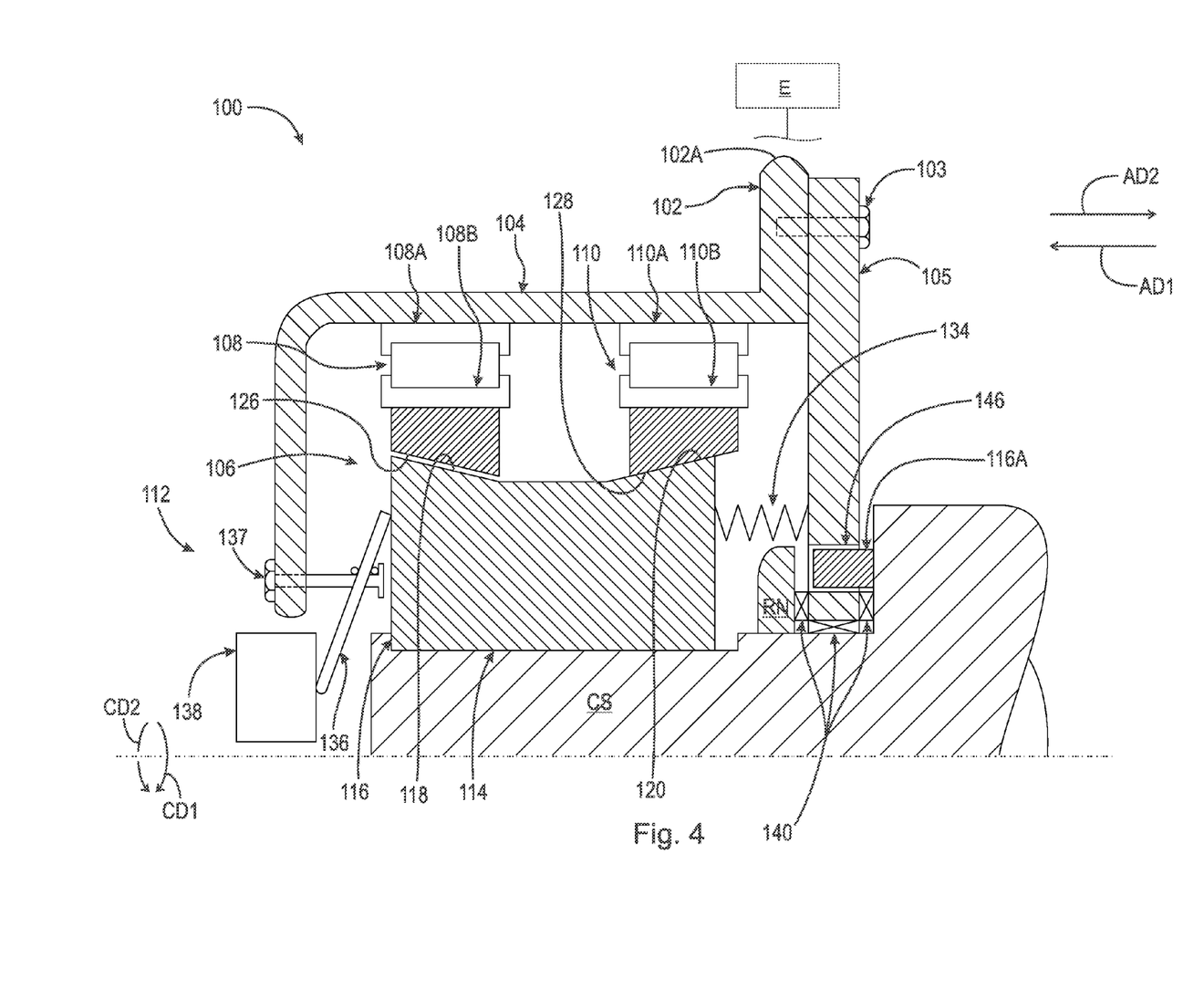
FIG. 4 is a cross-sectional view of a second example embodiment of a camshaft phaser with cone clutches in an advance mode.

FIG. 4 is a cross-sectional view of a second example embodiment of camshaft phaser 100 with cone clutches in an advance mode.

Figure 5:
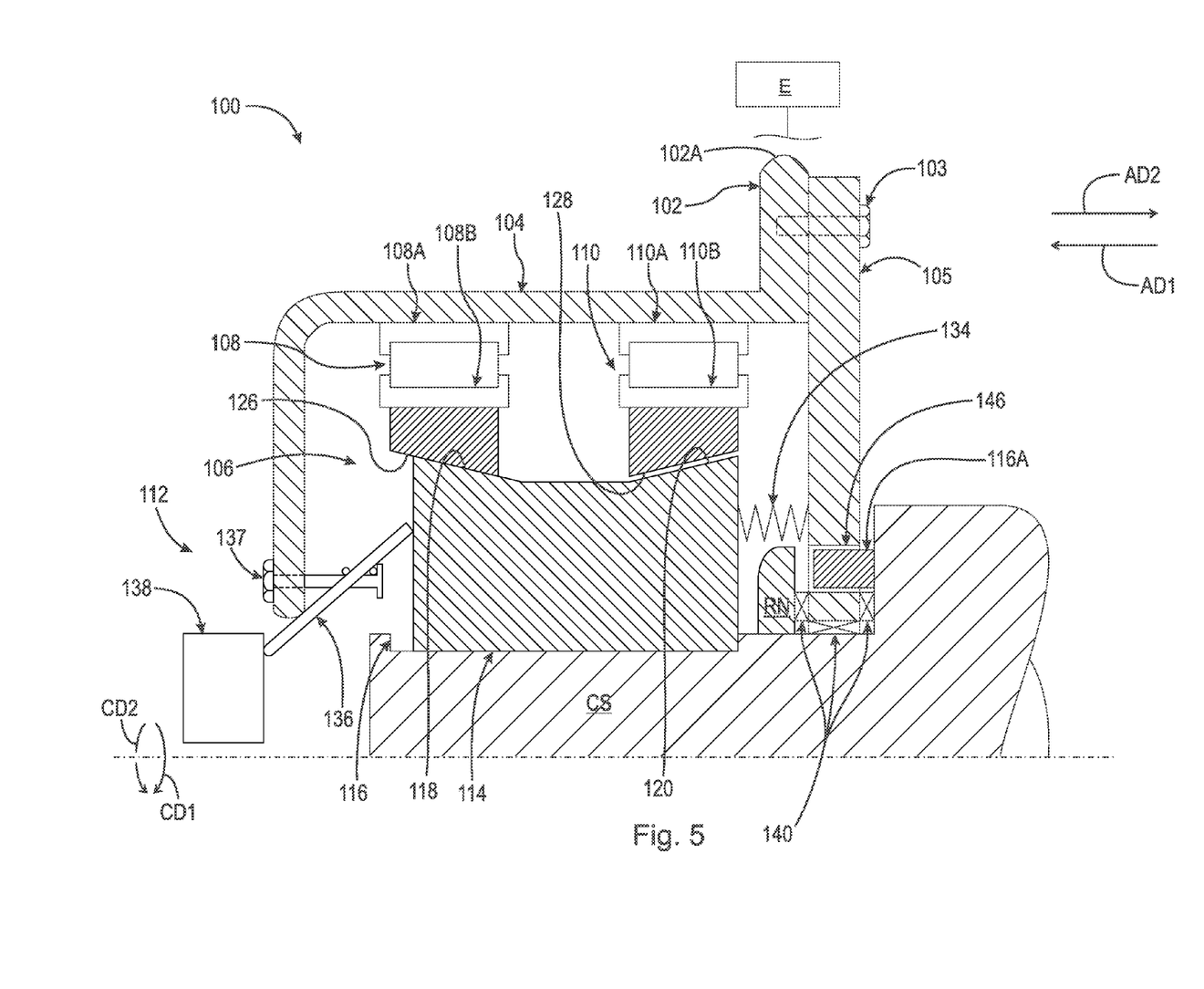
FIG. 5 is a cross-sectional view of the camshaft phaser shown in FIG. 4 in an retard mode; and, FIG. 6 is a cross-sectional view of a back plate, taken generally along line 6-6 in FIG. 2.

FIG. 5 is a cross-sectional view of the camshaft phaser shown in FIG. 4 in a retard mode. In FIGS. 4 and 5, frusto-conical shaped surfaces 118 and 126 taper radially outward in axial direction AD1 and frusto-conical shaped surfaces 120 and 128 taper radially outward in axial direction AD2. The discussion for FIGS. 2 and 3 is applicable to FIGS. 4 and 5 except as noted.

For the advance mode, displacement assembly 112 is arranged to displace cone-clutch component 114 in axial direction AD1 so that frusto-conical shaped surface 120 non-rotatably connects to frusto-conical shaped surface 128 and frusto-conical shaped surfaces 120 and 128 (and camshaft CS) are rotatable with respect to housing 102 in circumferential direction CD1 (clutch 110 is rotatable in direction CD1). The non-rotatable connection of frusto-conical shaped surfaces 120 and 128 is arranged to block rotation of frusto-conical shaped surface 120 (and camshaft CS), with respect to housing 102, in circumferential direction CD2, since clutch 110 is rotatable only in direction CD1.

For the retard mode, displacement assembly 112 is arranged to displace cone-clutch component 114 in axial direction AD2 so that frusto-conical shaped surface 118 non-rotatably connects to frusto-conical shaped surface 126 and frusto-conical shaped surfaces 118 and 126 (and camshaft CS) are rotatable with respect to housing 102 in circumferential direction CD2 (clutch 108 is rotatable in direction CD2). The non-rotatable connection of frusto-conical shaped surfaces 118 and 126 is arranged to block rotation of frusto-conical shaped surfaces 118 (and camshaft CS), with respect to housing 102, in circumferential direction CD1, since clutch 108 is rotatable only in direction CD2.

Figure 6:
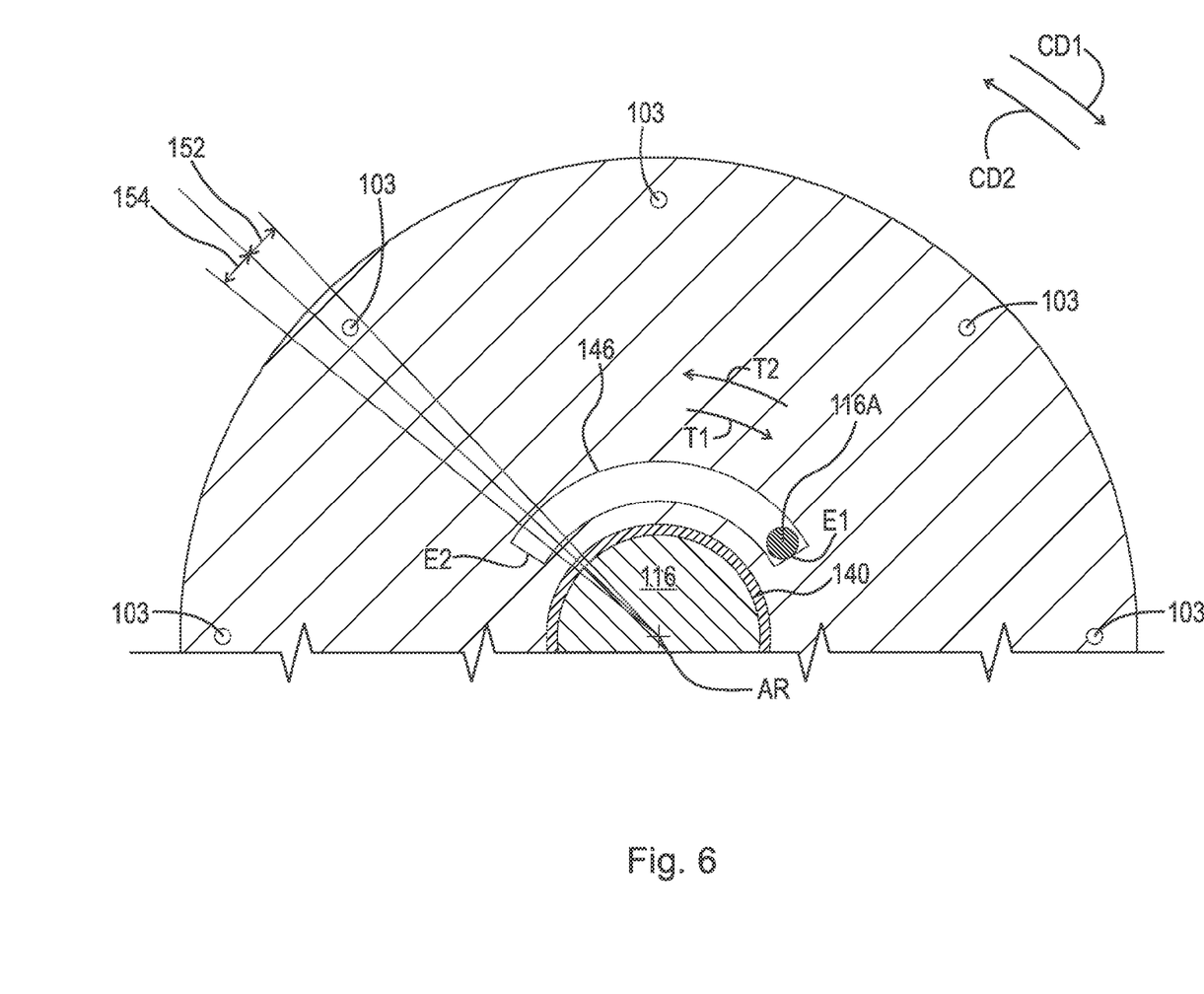

FIG. 6 is a cross-sectional view of back plate 105 taken generally along line 6-6 in FIG. 2.

As is known in the art, torsional forces T1 and T2 are transmitted from camshaft CS, in directions CD1 and CD2, respectively, to component 114 during operation of phaser 100. The torsional forces are due to interaction of cam lobes (not shown) on camshaft CS with various components of a valve train (not shown) of which camshaft CS is a part. Torsional forces T1 and T2 are transmitted in a repeating cycle. Housing 104 rotates in direction CD1 (due to the assumed torque from gear 102 as noted above); however, torsional force T1 urges component 114 in direction CD1 with respect to the housing and torsional force T2 urges component 114 in direction CD2 with respect to the housing. During operation, housing 104, component 114, and camshaft CS are always rotating in direction CD1. However, unchecked, torque T1 and T2 cause camshaft CS and component 114 to speed up and slow down, respectively, relative to gear 102.

Since clutch 110 is engaged for the advance mode, each iteration of force T1 causes relative rotation of camshaft CS and component 114 by amount 152 with respect to housing 104, in direction CD1 (clutch 110 is rotatable in direction CD1). Each iteration of force T2 urges component 114 in direction CD2. However, clutch 110 can only rotate in direction CD1. Therefore, rotation of component 114 and camshaft CS in direction CD2 is blocked by clutch 110. Thus, for every cycle of forces T1 and T2, camshaft CS rotates by amount 152 in direction CD1. Camshaft CS continues to rotate by amounts 152 in direction CD1 until pin 116A contacts E1 of aperture 146.

Since clutch 108 is engaged for the retard mode, each iteration of force T2 causes relative rotation of camshaft CS and component 114 by amount 154 with respect to housing 104, in direction CD2 (clutch 108 is rotatable in direction CD2). Each iteration of force T1 urges component 114 in direction CD1. However, clutch 108 can only rotate in direction CD2. Therefore, rotation of component 114 and camshaft CS in direction CD1 is blocked by clutch 108. Thus, for every cycle of forces T1 and T2, camshaft CS rotates by amount 154 in direction CD2. Camshaft CS continues to rotate by amounts 154 in direction CD2 until pin 116A contacts E2 of aperture 146.

The following should be viewed in light of FIGS. 2 through 6. The following describes a method for phasing a camshaft. Although the method is presented as a sequence of steps for clarity, no order should be inferred from the sequence unless explicitly stated. A first step receives, using a gear non-rotatably connected to a housing for a camshaft phaser, torque from an engine. A second step, for an advance mode: displaces a first frusto-conical shaped surface for the camshaft phaser in a first axial direction, the first frusto-conical shaped surface non-rotatably connected to the camshaft; and connects the first frusto-conical shaped surface to a second frusto-conical shaped surface included in an inner race for a first one-way clutch included in the camshaft phaser and non-rotatably connected to a housing for the camshaft phaser. A third step, for a retard mode: displaces, in a second axial direction opposite the first axial direction, a third frusto-conical shaped surface for the camshaft phaser, the third frusto-conical shaped surface non-rotatably connected to the camshaft; and non-rotatably connects the third frusto-conical shaped surface to a fourth frusto-conical shaped surface included in an inner race for a second one-way clutch included in the camshaft phaser and non-rotatably connected to the housing included in an inner race for the second one-way clutch.

An fourth step blocks, using the non-rotatable connection of the first and second frusto-conical shaped surfaces, rotation of the first frusto-conical shaped surface, with respect to the housing, in a first circumferential direction. A fifth step blocks, using the non-rotatable connection of the third and fourth frusto-conical shaped surfaces, rotation of the second frusto-conical shaped surface, with respect to the housing, in a second circumferential direction.

An sixth step urges, with a first resilient element included in a displacement assembly for the camshaft phaser, the first frusto-conical surface in the first axial direction. A seventh step urges, with a second resilient element included in the displacement assembly, the third frusto-conical surface in the second axial direction.

Advantageously, phaser 100 and a method using phaser 100 provide a robust camshaft phasing without the use of hydraulic fluid in an engine including the camshaft. This is particularly advantageous for smaller engines, for example, for outboard motors, motorcycles, or all-terrain vehicles that have limited supplies of available hydraulic fluid. Many of these applications (e.g., outboard marine engines) derive substantial benefit from having dual-position functionality (i.e., either fully advanced or fully retarded) without the need for continuous positioning control.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A camshaft phaser, comprising:
    a housing arranged to receive torque from an engine; and,
    a phase adjustment assembly including:
        first and second frusto-conical shaped surfaces:
            tapering in first and second opposite axial directions, respectively; and,
            arranged to non-rotatably connect to a camshaft;
        a first one-way clutch including:
            a first outer race non-rotatably connected to the housing; and,
            a first inner race including a third frusto-conical shaped surface; and,
        a second one-way clutch including:
            a second outer race non-rotatably connected to the housing; and,
            a second inner race including a fourth frusto-conical shaped surface; and,
        a displacement assembly including:
            a first resilient element arranged to, for an advance mode, displace the first frusto-conical shaped surface in the first axial direction so that:
                the first frusto-conical shaped surface non-rotatably connects to the third frusto-conical shaped surface; and,
                the second frusto-conical shaped surface is rotatable with respect to the housing in a first circumferential direction; and,
            a second resilient element arranged to, for a retard mode, displace the second frusto-conical shaped surface in the second axial direction so that:
                the second frusto-conical shaped surface non-rotatably connects to the fourth frusto-conical shaped surface; and,
                the first frusto-conical shaped surface is rotatable with respect to the housing in a second circumferential direction, opposite the first circumferential direction.

2. The camshaft phaser of claim 1, wherein:
    for the advance mode, the non-rotatable connection of the first and third frusto-conical shaped surfaces is arranged to block rotation of the first frusto-conical shaped surface, with respect to the housing, in the second circumferential direction; and,
    for the retard mode, the non-rotatable connection of the second and fourth frusto-conical shaped surfaces is arranged to block rotation of the second frusto-conical shaped surface, with respect to the housing, in the first circumferential direction.

3. The camshaft phaser of claim 2, wherein the first and second one-way clutches are axially fixed with respect to the housing.

4. The camshaft phaser of claim 1, wherein the phase adjustment assembly includes a cone-clutch component:
    arranged to non-rotatable connect to the camshaft; and,
    including the first and second frusto-conical shaped surfaces.

5. The camshaft phaser of claim 1, wherein the displacement assembly further comprises a linear actuator arranged to displace the second resilient element.

6. The camshaft phaser of claim 1, wherein the second resilient element is a diaphragm spring.

7. The camshaft phaser of claim 1, wherein:
    the first and third frusto-conical shaped surface tapers radially outward in the first axial direction; and,
    the second and fourth frusto-conical shaped surface tapers radially outward in the second axial direction.

8. The camshaft phaser of claim 1, wherein:
    the first and third frusto-conical shaped surfaces taper radially inward in first axial direction; and,
    the second and fourth frusto-conical shaped surfaces taper radially inward in the second axial direction.

9. A camshaft phaser, comprising:
    a housing arranged to receive torque from an engine; and,
    a phase adjustment assembly including:
        a first one-way clutch with a first frusto-conical shaped surface;
        a second one-way clutch with a second frusto-conical shaped surface;
        a cone-clutch component:
            arranged to non-rotatably connect to the camshaft; and,
            including third and fourth frusto-conical shaped surfaces; and,
        a displacement assembly including:
            a first resilient element arranged to, for an advance mode, displace the cone-clutch component in the first axial direction so that:
                the first frusto-conical shaped surface non-rotatably connects to the third frusto-conical shaped surface; and,
                the second frusto-conical shaped surface is rotatable with respect to the housing in a first circumferential direction; and,
            a second resilient element arranged to, for a retard mode, displace the cone-clutch component in the second axial direction so that:
                the second frusto-conical shaped surface non-rotatably connects to the fourth frusto-conical shaped surface; and,
                the first frusto-conical shaped surface is rotatable with respect to the housing in a second circumferential direction, opposite the first circumferential direction.

10. The camshaft phaser of claim 9, wherein the displacement assembly further comprises a linear actuator arranged to displace the second resilient element.

11. The camshaft phaser of claim 9, wherein the second resilient element is a diaphragm spring.

12. The camshaft phaser of claim 9, wherein:
    the first and third frusto-conical shaped surfaces taper radially outward in first axial direction; and, the second and fourth frusto-conical shaped surfaces taper radially outward in the second axial direction.

13. The camshaft phaser of claim 9, wherein:
the first and third frusto-conical shaped surfaces taper radially inward in first axial direction; and,
the second and fourth frusto-conical shaped surfaces taper radially inward in the second axial direction.

14. The camshaft phaser of claim 9, wherein:
for the advance mode, the non-rotatable connection of the first and third frusto-conical shaped surfaces is arranged to block rotation of the cone-clutch component, with respect to the housing, in the second circumferential direction; and,
for the retard mode, the non-rotatable connection of the second and fourth frusto-conical shaped surfaces is arranged to block rotation of the cone-clutch component, with respect to the housing, in the first circumferential direction.

15. The camshaft phaser of claim 9, wherein:
the first one-way clutch includes:
    a first outer race non-rotatably connected to the housing; and,
    a first inner race including the first frusto-conical shaped surface; and,
the second one-way clutch includes:
    a second outer race non-rotatably connected to the housing; and,
    a second inner race including the second frusto-conical shaped surface.

16. The camshaft phaser of claim 15, wherein the first and second one-way clutches are axially fixed with respect to the housing.

17. A method of phasing a camshaft, comprising:
receiving, using a housing for a camshaft phaser, torque from an engine;
for an advance mode:
    displacing, in a first axial direction and using a first resilient element, a first frusto-conical shaped surface for the camshaft phaser, the first frusto-conical shaped surface non-rotatably connected to the camshaft; and,
    non-rotatably connecting the first frusto-conical shaped surface to a second frusto-conical shaped surface included in an inner race for a first one-way clutch included in the camshaft phaser and non-rotatably connected to a housing for the camshaft phaser; and,
for a retard mode:
    displacing, in a second axial direction opposite the first axial direction and using a second resilient element, a third frusto-conical shaped surface for the camshaft phaser, the third frusto-conical shaped surface non-rotatably connected to the camshaft; and,
    non-rotatably connecting the third frusto-conical shaped surface to a fourth frusto-conical shaped surface included in an inner race for a second one-way clutch included in the camshaft phaser and non-rotatably connected to the housing included in an inner race for the second one-way clutch.

18. The method of claim 17, further comprising:
blocking, using the non-rotatable connection of the first and second frusto-conical shaped surfaces, rotation of the first frusto-conical shaped surface with respect to the housing, in a first circumferential direction; and,
blocking, using the non-rotatable connection of the third and fourth third frusto-conical shaped surfaces, rotation of the third frusto-conical shaped surface with respect to the housing, in a second circumferential direction, opposite the first circumferential direction.

19. The method of claim 18, further comprising:
displacing the second resilient element with a linear actuator.

20. The method of claim 18, wherein:
non-rotatably connecting the first frusto-conical shaped surface to the second frusto-conical shaped surface includes connecting first and second frusto-conical shaped surfaces each tapering radially inward in the first axial direction or each tapering radially outward in the first axial direction; and,
non-rotatably connecting the third frusto-conical shaped surface to the fourth frusto-conical shaped surface includes connecting third and fourth frusto-conical shaped surfaces each tapering radially inward in the first axial direction or each tapering radially outward in the first axial direction.

\* \* \* \* \*